US012699539B2

(12) United States Patent
Mao et al.

(10) Patent No.: US 12,699,539 B2
(45) Date of Patent: Aug. 4, 2026

(54) HEADPHONES AND METHODS FOR ADJUSTING SOUND EFFECTS OF HEADPHONES

(71) Applicant: SHENZHEN SHOKZ CO., LTD., Shenzhen (CN)

(72) Inventors: Xinnan Mao, Shenzhen (CN); Kai Liang, Shenzhen (CN); Yu Wang, Shenzhen (CN); Jiajun Liu, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 282 days.

(21) Appl. No.: 18/300,817

(22) Filed: Apr. 14, 2023

(65) Prior Publication Data

US 2023/0251821 A1     Aug. 10, 2023

Related U.S. Application Data

(63) Continuation of application No. PCT/CN2022/103955, filed on Jul. 5, 2022.

(30) Foreign Application Priority Data

Jul. 16, 2021     (CN) ......................... 202110806733.4

(51) Int. Cl.
H04R 3/04 (2006.01)
G06F 3/0482 (2013.01)
(Continued)

(52) U.S. Cl.
CPC ............ G06F 3/165 (2013.01); G06F 3/0482 (2013.01); H04R 1/1041 (2013.01); H04R 3/04 (2013.01);
(Continued)

(58) Field of Classification Search
CPC ....... H04R 3/04; H04R 2420/07; G06F 3/165; G06F 3/0482; H04W 76/10
See application file for complete search history.

(56) References Cited

U.S. PATENT DOCUMENTS 8,767,996 B1     7/2014  Lin et al.
10,462,551 B1 *  10/2019  Kemmerer ........... H04R 29/001
(Continued)

FOREIGN PATENT DOCUMENTS

CN          105704597 A     6/2016
CN          106095384 A     11/2016
(Continued)

OTHER PUBLICATIONS

Ghani, Uzair. "How to Access the Control Center on iPhone X." wccftech, Nov. 3, 2017, wccftech.com/iphone-x-control-center/. (Year: 2017).*

(Continued)

*Primary Examiner* — James K Mooney
(74) *Attorney, Agent, or Firm* — Metis IP LLC

(57) ABSTRACT

The present disclosure relates to headphones and methods for adjusting sound effects of the headphones. The headphone may comprise a speaker, configured to play an audio file; a communication module, configured to establish a communication connection with a terminal device, wherein the terminal device includes a display screen configured to display a first user interface, the first user interface includes one or more selection controls configured to select any sound effect mode from at least two different sound effect modes, and sound parameters of audio streams of the audio file played by the speaker of the headphone in the different sound effect modes have different values; and an optimization module, configured to adjust, based on a correspondence between a certain sound effect mode and its corresponding values of the sound parameters, values of the
(Continued)

sound parameters of an audio stream of the audio file to the corresponding values of the sound parameters of the certain sound effect mode.

19 Claims, 16 Drawing Sheets

(51) Int. Cl.

| | |
|---|---|
| *G06F 3/16* | (2006.01) |
| *H04R 1/10* | (2006.01) |
| *H04W 76/10* | (2018.01) |

(52) U.S. Cl.
CPC ......... *H04W 76/10* (2018.02); *H04R 2420/07* (2013.01)

(56) References Cited

U.S. PATENT DOCUMENTS

| | | | | |
|---|---|---|---|---|
| 2007/0206829 | A1* | 9/2007 | Weinans | ............. H04M 1/6066 381/370 |
| 2008/0205664 | A1 | 8/2008 | Kim et al. | |
| 2010/0150383 | A1 | 6/2010 | Sampat | |
| 2015/0195663 | A1* | 7/2015 | Lin | ....................... G06F 16/635 381/58 |
| 2019/0037298 | A1 | 1/2019 | Reily et al. | |
| 2021/0014600 | A1* | 1/2021 | Neumaier | ........... H04R 1/1008 |
| 2022/0394414 | A1 | 12/2022 | Lin | |
| 2023/0059427 | A1 | 2/2023 | Yin et al. | |
| 2023/0251821 | A1 | 8/2023 | Mao et al. | |

FOREIGN PATENT DOCUMENTS

| | | |
|---|---|---|
| CN | 107493543 A | 12/2017 |
| CN | 109218876 A | 1/2019 |
| CN | 110324751 A | 10/2019 |
| CN | 112312368 A | 2/2021 |
| CN | 112437374 A | 3/2021 |

OTHER PUBLICATIONS

Turner, Nicholas. "Jabra Sound Plus App | Full Review / Walk-Through." YouTube, Mar. 5, 2020, www.youtube.com/watch?v=LgSjrCPCbok. (Year: 2020).*
Jabra Elite 75t User Manual. GN Audio A/S, 2020. (Year: 2020).*
"Mastering Your EQ Settings.", Shokz, Nov. 1, 2016, ca.shokz.com/blogs/news/masteringeq. (Year: 2016).*
International Search Report in PCT/CN2022/103955 mailed on Sep. 26, 2022, 5 pages.

* cited by examiner

9:41

EQ Modes

Standard

Vocal

Earplug

9:41

< EQ Modes

Standard

Vocal

Name : OpenRun Pro

Model : S810

S/N : S900XXXXXXXXX   Copy

Firmware version : v3.2.1

Pair Two Devices

Switch between two devices seamlessly with multipoint pairing.

OK

Headphones Are Ready To Pair To The Second Device.

HEADPHONES AND METHODS FOR ADJUSTING SOUND EFFECTS OF HEADPHONES

CROSS-REFERENCE TO RELATED APPLICATIONS

This application is a continuation of International Application No. PCT/CN2022/103955, filed on Jul. 5, 2022, which claims the priority of Chinese Patent Application No. 202110806733.4, filed on Jul. 16, 2021, entitled "Headphones And Methods For Adjusting Sound Effects of Headphones", the contents of each of which are hereby incorporated by reference.

TECHNICAL FIELD

The present disclosure relates to the technical field of electronic devices, and in particular to the field of headphones.

BACKGROUND

At present, in most of the sound effect adjustment methods of headphones, a user may need to select the favorite sound effect mode in settings or applications. Currently, the sound effect modes provided by the headphones are mostly designed according to the music style or music type. The User may obtain different musical experiences for a same piece of music by switching between different sound effect modes, such as pop, rock, classical, and folk. However, neither headphones nor other terminals provide special sound effect modes designed according to the wearing state of the human ear or the type of audio file to be played. As a result, the user cannot obtain the optimal listening experience in different scenarios.

SUMMARY

The embodiments of the present disclosure provide a headphone, comprising: a speaker, configured to play an audio file; a communication module, configured to establish a communication connection with a terminal device, wherein the terminal device includes a display screen configured to display a first user interface, the first user interface includes one or more selection controls configured to select any sound effect mode from at least two different sound effect modes, and sound parameters of audio streams of the audio file played by the speaker of the headphone in the different sound effect modes have different values; an optimization module, configured to adjust, based on a correspondence between a certain sound effect mode and its corresponding values of the sound parameters, values of the sound parameters of an audio stream of the audio file to the corresponding values of the sound parameters of the certain sound effect mode; and a controller, configured to control the communication module to receive a selection instruction for the certain sound effect mode instructed by a user by triggering a selection control of the one or more selection controls, control the communication module to receive the audio stream of the audio file from the terminal device, control the optimization module to process the audio stream of the audio file and output the audio stream of the audio file to the speaker, and control the speaker to play the audio file.

Optionally, the at least two different sound effect modes include a first sound effect mode and a second sound effect mode, wherein in the first sound effect mode, in a frequency response curve of an electrical signal of the audio file processed by the optimization module, a signal response in a frequency band of 200 Hz-10 kHz has a flat trend, and a signal response in a frequency band below 100 Hz is weaker than the signal response in the frequency band of 200 Hz-10 kHz; and in the second sound effect mode, in a frequency response curve of an electrical signal of the audio file processed by the optimization module, a signal response in a frequency band below 1 kHz is weaker than a signal response in a frequency band above 1 kHz.

Optionally, the at least two different sound effect modes include a third sound effect mode, in the third sound effect mode, in a frequency response curve of an electrical signal of the audio file processed by the optimization module, a signal response in a frequency band of 400 Hz-3 kHz is significantly enhanced relative to signal responses in other frequency bands.

Optionally, the headphone further includes a sensor configured to detect a wearing state of a human ear; and the controller is configured to select a specific sound effect mode from the at least two different sound effect modes based on the wearing state of the human ear detected by the sensor, and control the speaker to play the audio file in the specific sound effect mode.

Optionally, the headphone further includes a parsing module configured to parse a type of an audio file to be played; and the controller selects a specific sound effect mode from the at least two different sound effect modes based on the type of the audio file determined by the parsing module, and controls the speaker to play the audio file in the specific sound effect mode.

Optionally, the headphone further includes a storage and an input module, the input module is configured to input the corresponding values of the sound parameters of each sound effect mode of the at least two different sound effect modes, and the storage is configured to store the corresponding values of the sound parameters of each sound effect mode.

Optionally, the first user interface includes a main operation interface, and the main operation interface includes at least one of: a playback operation control, a Bluetooth connection control, and a tuning control, wherein the playback operation control is configured to control the speaker to play or pause a playback of the audio file, the Bluetooth connection control is configured to connect the headphone to the terminal device, and the tuning control is configured to adjust a volume of the speaker when playing the audio file.

Optionally, the first user interface includes a sound effect setting interface, and the sound effect setting interface pops up when the terminal receives a sound effect setting instruction from the user; and each selection control of the one or more selection controls corresponding to the at least two different sound effect modes includes an operation region for receiving the selection instruction from the user, and a ratio of a total area of the operation regions of the one or more selection controls to a total area of the sound effect setting interface is greater than or equal to 0.2 and less than or equal to 1.

Optionally, the each selection control of the one or more selection controls corresponding to the at least two different sound effect modes further includes an operation description region configured to explain functions of the operation region, wherein when the first user interface is the main operation interface, the operation description region and the operation region at least partially overlap, and when the first user interface is the sound effect setting interface, the operation description region and the operation region are disposed independently.

A method for adjusting a sound effect of a headphone, comprising: obtaining wearing state information of a human ear and/or type information of an audio file to be played; selecting, based on the wearing state information of the human ear and/or the type information of the audio file to be played, a corresponding sound effect mode on a terminal device that is in a communication connection with the headphone; and adjusting, based on corresponding values of sound parameters of the selected sound effect mode, the sound effect when the headphone plays the audio file.

A headphone, comprising: a speaker, configured to play an audio file; a communication module, configured to establish a communication connection with at least one terminal device, wherein the at least one terminal device includes a display screen configured to display a second user interface, the second user interface includes a multi-device connection function control configured to turn on or off a dual-device connection function, when the multi-device connection function control is turned on, the communication module is configured to establish the communication connection with at least two terminal devices, and when the multi-device connection control is turned off, the communication module is configured to establish a communication connection with only one terminal device; and a controller, configured to control the communication module to receive the audio file from the terminal device that is in the communication connection with the headphone and control the speaker to play the audio file.

Optionally, the multi-device connection function control is a dual-device connection function control configured to turn on a dual-device connection function; and the communication module is configured to establish a Bluetooth connection with at least one terminal device.

Optionally, the second user interface further includes a terminal connection control configured to establish or disconnect a communication connection between the headphone and the terminal device.

A headphone, comprising: a speaker, configured to play an audio file; a communication module, configured to establish a communication connection with at least one terminal device; and a controller configured to control the communication module to receive the audio file from the terminal device and control the speaker to play the audio file; wherein the headphone has a first connection mode and a second connection mode which are switchable, when the headphone is in the first connection mode, the communication module is configured to establish the communication connection with at least two terminal devices, and when the headphone is in the second connection mode, the communication module is configured to establish the communication connection with only one terminal device.

BRIEF DESCRIPTION OF THE DRAWINGS

In order to more clearly illustrate the technical solutions related to the embodiments of the present disclosure, the drawings used to describe the embodiments are briefly introduced below. Obviously, the drawings described below are only some examples or embodiments of the present disclosure. Those skilled in the art, without further creative efforts, may obtain other drawings according to these drawings.

DETAILED DESCRIPTION

The present disclosure is further illustrated in terms of drawings and exemplary embodiments. In particular, the following embodiments are only for illustrative purposes of the present disclosure, but not to limit the scope of the present disclosure. Similarly, the following embodiments are only some of the embodiments of the present disclosure but not all of them, and all other embodiments obtained by those having ordinary skills in the art, without creative efforts, fall within the protection scope of the present disclosure.

Reference in this disclosure to an "embodiment" means that a particular feature, structure, or characteristic described in connection with the embodiment may be included in at least one embodiment of the disclosure. It is understood explicitly and implicitly by those skilled in the art that the embodiments described in this disclosure may be combined with other embodiments.

Figure 1:
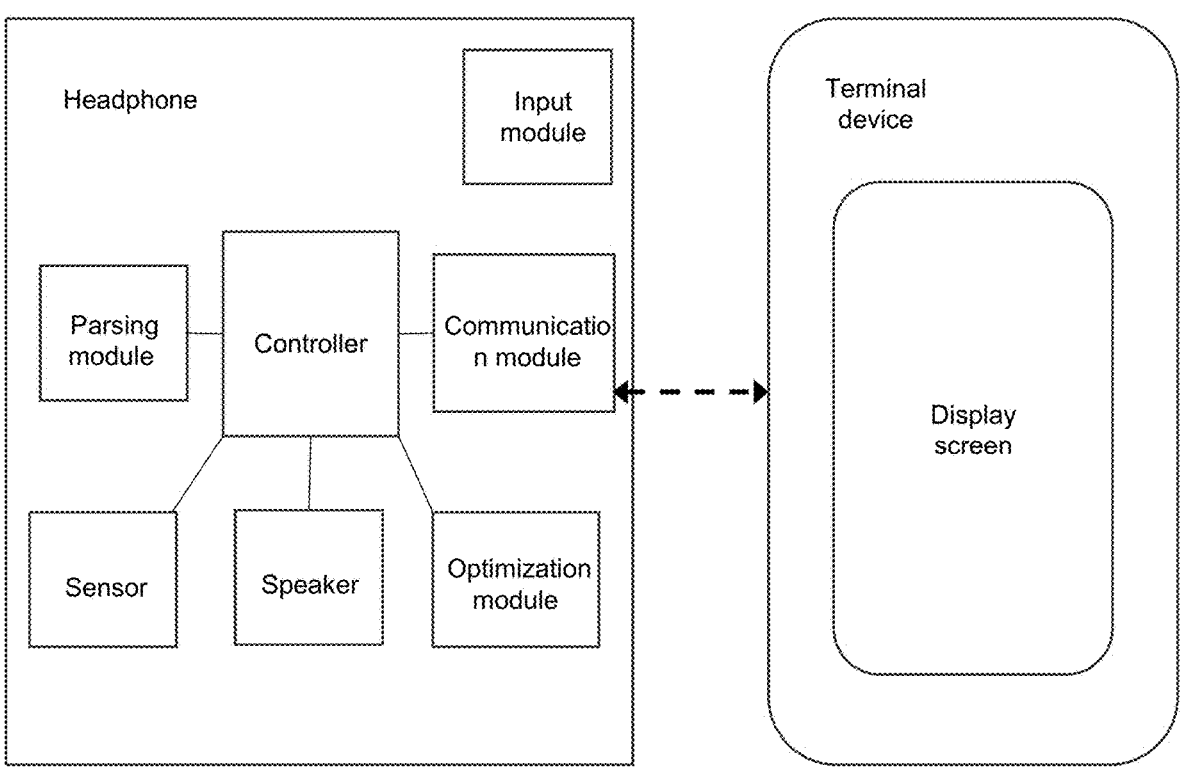
FIG. 1 is a schematic diagram illustrating a hardware structure of a headphone and a terminal device according to each embodiment of the present disclosure.

FIG. 1 is a schematic diagram of a structure of a headphone according to an embodiment the present disclosure. The headphone may comprise a speaker, a communication module, and a controller. The speaker may be configured to play an audio file. The communication module may be configured to establish a communication connection with a terminal device. The terminal device may include a display screen. The display screen may be configured to display a first user interface. The first user interface may include one or more selection controls configured to select any sound effect mode from at least two different sound effect modes.

The headphone may be a wired headphone or a wireless headphone. When the headphone is a wireless headphone, preferably, the headphone may establish the communication connection with the terminal device via Bluetooth. The terminal device may be a mobile phone, an IPAD, a desktop computer, a notebook computer, etc., which is not limited here. The terminal device may include a processor and a display screen. An application program of the headphone may be installed on the terminal device. When a user turns on the application program on the terminal device, the processor of the terminal device may execute a preset program to control the display screen to display the first user interface of the application program.

Sound parameters of audio streams of the audio file played by the speaker of the headphone in different sound effect modes may have different values. The values of the sound parameters may include at least one of: a response value of a certain frequency band, an effective dynamic range of a volume, a low-frequency gain of a noise threshold, a subwoofer intensity, a subwoofer center frequency, etc. The controller may be configured to control the communication module to receive a selection instruction for a certain sound effect mode instructed by the user by triggering a selection control of the one or more selection controls, and control the speaker to play the audio file according to the selected sound effect mode.

The controlling the speaker to play the audio file according to the selected sound effect mode, as an optional implementation, may be implemented by an optimization module configured to adjust values of the sound parameters of an audio stream of the audio file to corresponding values of the sound parameters of the selected sound effect mode. Specifically, the controller may receive the selection instruction for a certain sound effect mode, determine corresponding values of the sound parameters of the certain sound effect mode, and control the optimization module to optimize the audio stream of the audio file to be played according to the corresponding values of the sound parameters. Further, the controller may control the optimization module to output the optimized audio stream of the audio file to the speaker, and then control the speaker to emit sound to the outside according to the received audio stream. The optimization module may be a digital signal processor.

Optionally, the headphone may further include a storage and an input module. The input module may be configured to input the corresponding values of the sound parameters of each sound effect mode of the at least two different sound effect modes. The storage may be configured to store the corresponding values of the sound parameters of each sound effect mode. The input module may be hardware devices such as a keyboard, a mouse, a touch screen, etc., configured for headphone developers to write the corresponding values of the sound parameters of each sound effect mode before the headphone leaves the factory, or for users to customize the corresponding values of the sound parameters of each sound effect mode according to actual needs.

According to the present disclosure, a first sound effect mode may be a standard mode to adapt to the human ear without earplugs, i.e., when the ear canal is in an open state; a second sound effect mode may be an earplug mode to adapt to the human ear wearing earplugs, i.e., the ear canal is in a blocked state; a third sound effect mode may be suitable for playing an audio file with a large proportion of vocal or a large proportion of intermediate frequency, such as an e-book, a voice navigation, an online course, etc.; and a fourth sound effect mode (as an embodiment, the fourth sound effect mode may be the first sound effect mode) may be suitable for playing music or an audio file with a relatively small proportion of vocal or a small proportion of intermediate frequency, such as an instrumental piece.

Figure 10:
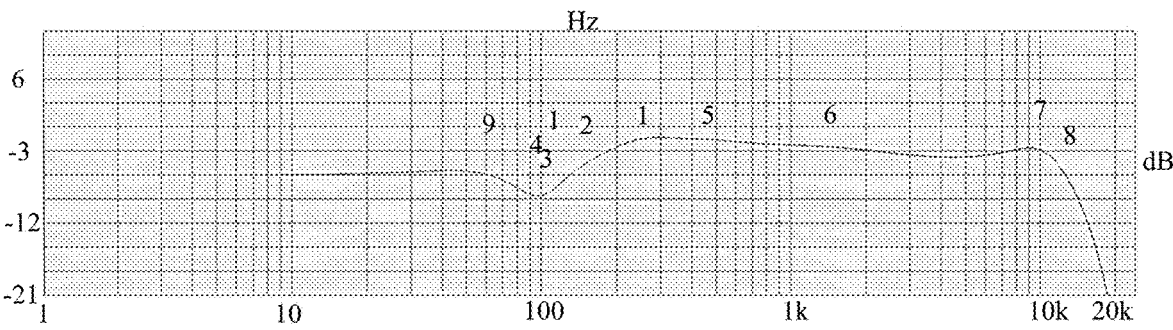
FIG. 10 is a frequency response curve of a first sound effect mode according to an embodiment of the present disclosure.
Figure 11:
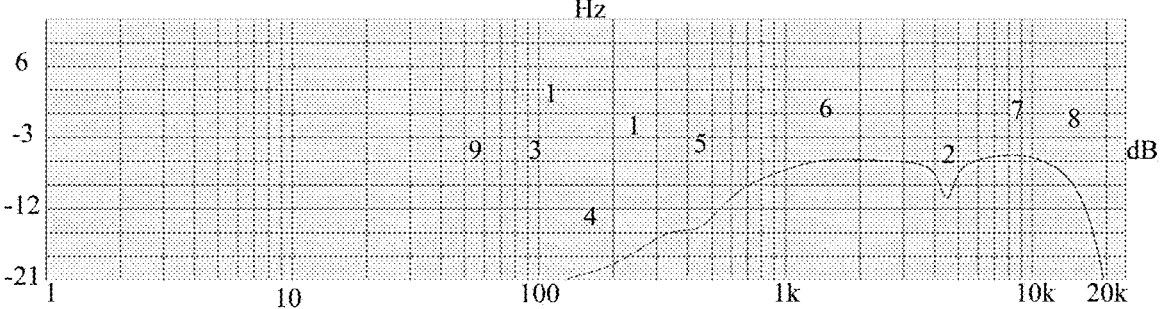
FIG. 11 is a frequency response curve of a second sound effect mode of an embodiment of the present disclosure.
Figure 12:
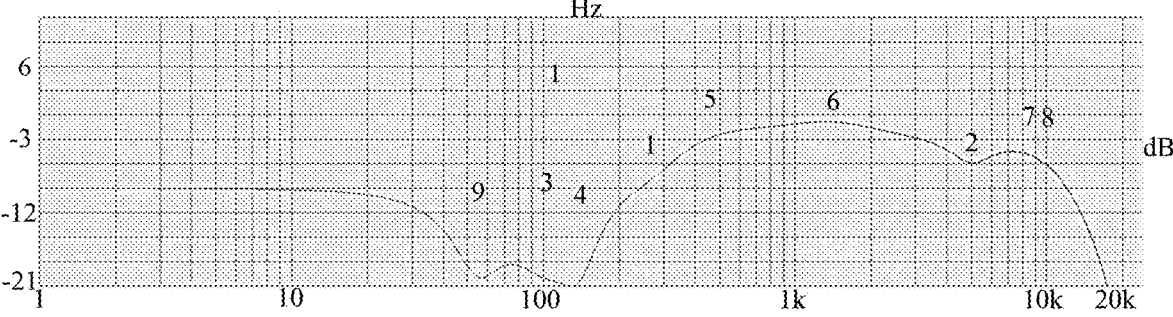
FIG. 12 is a frequency response curve of a second sound effect mode of an embodiment of the present disclosure.

As shown in FIGS. 10-11, the at least two different sound effect modes may include the first sound effect mode and the second sound effect mode. FIG. 11 is a frequency response curve of the first sound effect mode, and FIG. 12 is a frequency response curve of the second sound effect mode. In the first sound effect mode, in a frequency response curve of an electrical signal of the audio file processed by the optimization module, a signal response in a frequency band of 200 Hz-10 kHz may have a flat trend, and a signal response in a frequency band below 100 Hz may be weaker than the signal response in the frequency band of 200 Hz-10 kHz. In the second sound effect mode, in the frequency response curve of the electrical signal of the audio file processed by the optimization module, a signal response in a frequency band below 1 kHz may be weaker than a signal response in a frequency band above 1 kHz. This design may satisfy different wearing states of the human ear. Specifically, the first sound effect mode may be more suitable for the state of the human ear without earplugs, and the second sound effect mode may be more suitable for the state of the human ear wearing the earplugs.

It should be noted that the wearing state of the human ear may include the state of the human ear wearing the headphone or the state of the human ear wearing other devices. The state of the human ear wearing the headphone may include a wearing position of a headphone, a wearing time of a headphone, etc. The state of the human ear wearing other devices may include whether the human ear wears other devices, a wearing position, a wearing time of other devices, etc. The other devices may include electronic and non-electronic devices such as an earplug, jewelry, other headphones, a hearing aid, etc.

Further, the headphone may include a sensor configured to detect the wearing state of the human ear. The controller may be configured to automatically select a specific sound effect mode from the at least two different sound effect modes according to the wearing state of the human ear detected by the sensor, and control the speaker to play the audio file in the specific sound effect mode.

As shown in FIG. 12, the at least two different sound effect modes may further include a third sound effect mode. In the third sound effect mode, in the frequency response curve of the electrical signal of the audio file processed by the optimization module, a signal response in a frequency band of 400 Hz-3 kHz may be significantly enhanced relative to signal responses in other frequency bands. In such cases, the third sound effect mode may be more suitable for playing a vocal audio file. In fact, the first sound effect mode of the present disclosure may be more suitable for playing a non-vocal audio file.

Further, the headphone may further include a parsing module configured to parse a type of an audio file to be played. The controller may select a specific sound effect mode from the at least two different sound effect modes according to the type of the audio file determined by the parsing module, and control the speaker to play the audio file in the specific sound effect mode.

Figure 2:
FIG. 2 illustrates an exemplary first user interface displayed on a display screen of the terminal device in FIG. 1.
Figure 2:
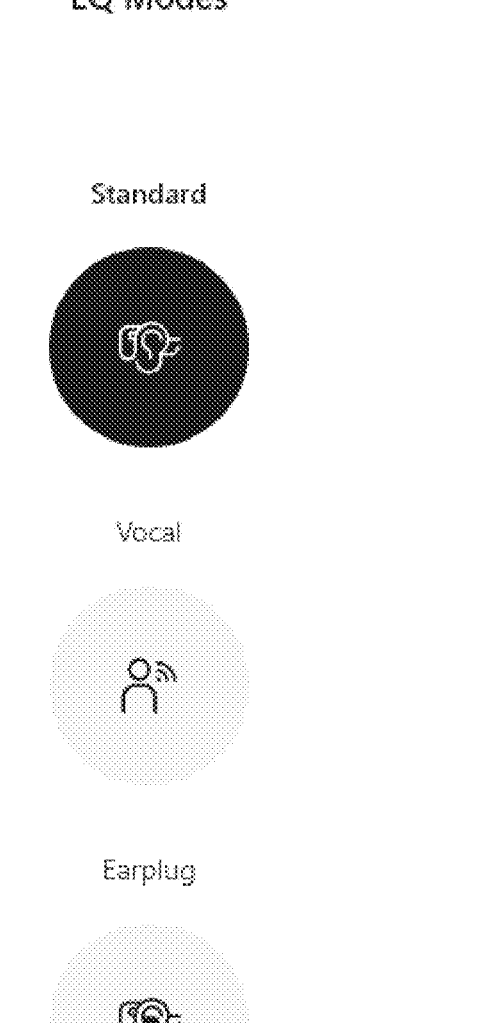
Figure 2:
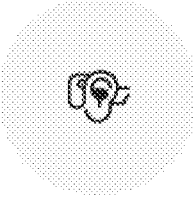
Figure 3:
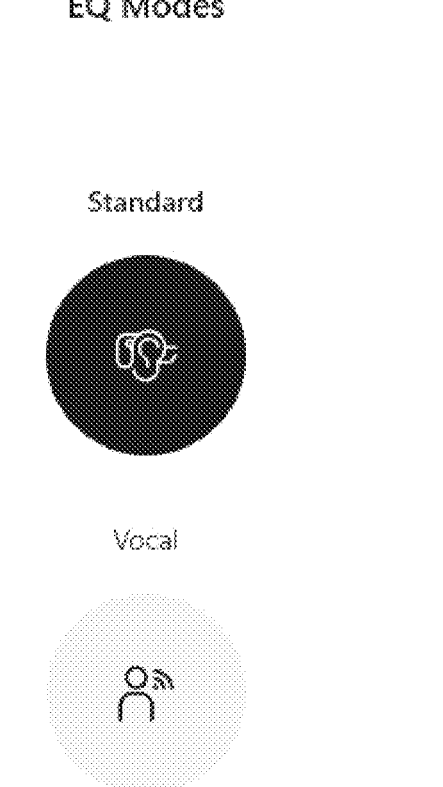
FIG. 3 illustrates an exemplary first user interface displayed on a display screen of the terminal device in FIG. 1.

As shown in FIGS. 2-3, the first user interface may include a sound effect setting interface. The sound effect mode setting interface in FIG. 2 may include a selection control for the first sound effect mode, a selection control for the second sound effect mode, a selection control for the third sound effect mode, and a selection control for the fourth sound effect mode. The sound effect setting interface may pop up when the terminal receives sound effect setting instruction from a user. Specifically, the user may enter a setting bar of the application program, and further open the sound effect setting interface for the user to select the sound effect mode. Specifically, the sound effect mode setting interface may include selection controls for the at least two sound effect modes.

Each selection control of the one or more selection controls corresponding to the sound effect modes may include an operation region for receiving a user selection instruction and an operation description region for explaining functions of the operation region. A ratio of a total area of the operation regions of the one or more selection controls to a total area of the sound effect setting interface may be greater than or equal to 0.2 and less than or equal to 1. Further, a ratio of the total area of the operation regions of the one or more selection controls to the total area of the sound effect setting interface may be greater than or equal to 0.4 and less than or equal to 0.8. As shown in FIG. 2, the selection controls corresponding to the sound effect modes may be disposed in the middle of the interface. The shape of an operation region may be circular, square, rhombus, etc., which is not limited here. The operation description region may include an icon description region and a text description region. As shown in FIG. 2, the text description region may be disposed above each operation region, and each text description region may include a text description of the functions of the operation region, such as "Standard", "Vocal", and "Earplug". The image description region may include one or more icons configured to describe the functions of the operation region. For example, an icon 1, i.e., an image showing a human ear wearing the headphone but not wearing the earplugs may be used to illustrate that the standard mode is suitable for this wearing state of the human ear; an icon 2, i.e., an image showing a human ear wearing the headphone and the earplugs may be used to illustrate that the earplug mode is suitable for this wearing state of the human ear; and an icon 3, i.e., an image showing a person speaking may be used to illustrate that the vocal mode is suitable for listening to a vocal audio. The operation description region and the operation region may at least partially overlap, that is, the text description region or the icon description region may at least partially overlap with the operation region. As shown in FIG. 2, an icon may be located inside the operation region, i.e., the icon description region and the operation region may overlap. Optionally, the operation description region and the operation region may be set independently, i.e., without overlapping. Further, the sound effect setting interface may further include an interface description region located at a top of the interface, as shown in FIG. 2, the interface description region may include a text description "EQ sound effect" mode.

A difference between the sound effect setting interface in FIG. 3 and the sound effect setting interface in FIG. 2 may be that selection controls for only two sound effect modes are disposed in the sound effect setting interface in FIG. 3.

Figure 4:
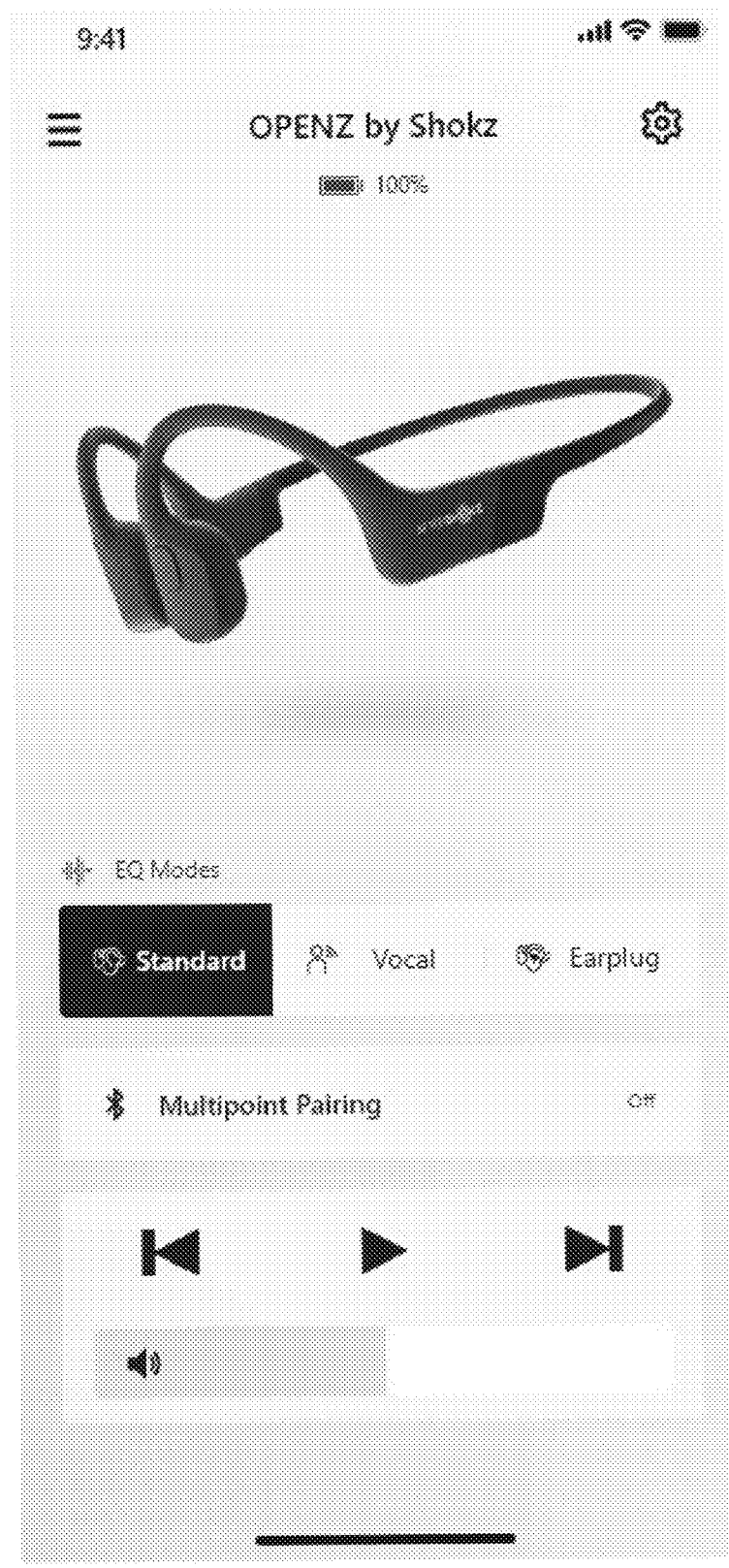
FIG. 4 illustrates an exemplary first user interface displayed on a display screen of the terminal device in FIG. 1.

The first user interface may include a main operation interface. The main operation interface may include at least one of: a playback operation control, a Bluetooth connection control, and a tuning control. The playback operation control may include a playback operation control configured to control the speaker to play or pause a playback of the audio file. The playback operation control may further include a switching control configured to control the speaker to switch the audio file, such as switch to a next audio file or to a previous audio file. The Bluetooth connection control may be configured to connect the headphone to the terminal device. The tuning control may be configured to adjust a volume of the speaker when playing the audio file. As shown in FIG. 4, the main operation interface may include selection controls for sound effect modes, a playback operation control, a Bluetooth connection control, and a tuning control. A selection control for the sound effect mode may further include a text description region and an icon description region. Both the text description region and the icon description region may overlap with an operation region such that the interface may be more compact.

Figure 5:
FIG. 5 illustrates a secondary interface of the first user interface in FIG. 4.
Figure 5:
Figure 6:
FIG. 6 illustrates a tertiary interface of the first user interface in FIG. 4.
Figure 6:
Figure 7:
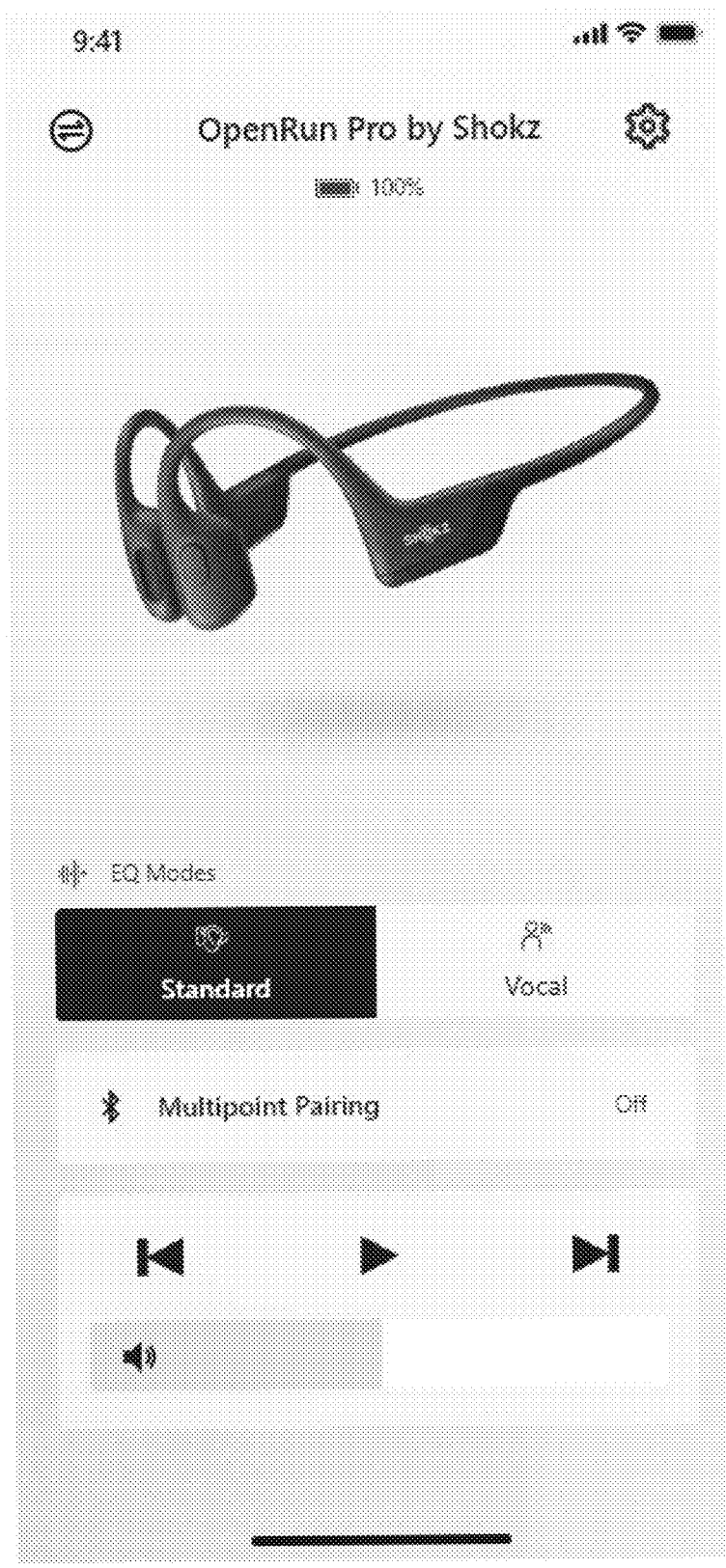
FIG. 7 illustrates an exemplary first user interface displayed on a display screen of the terminal device in FIG. 1.
Figure 8:
FIG. 8 illustrates a secondary interface of the first user interface in FIG. 7.
Figure 8:
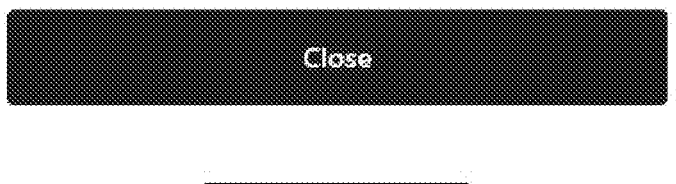
Figure 9:
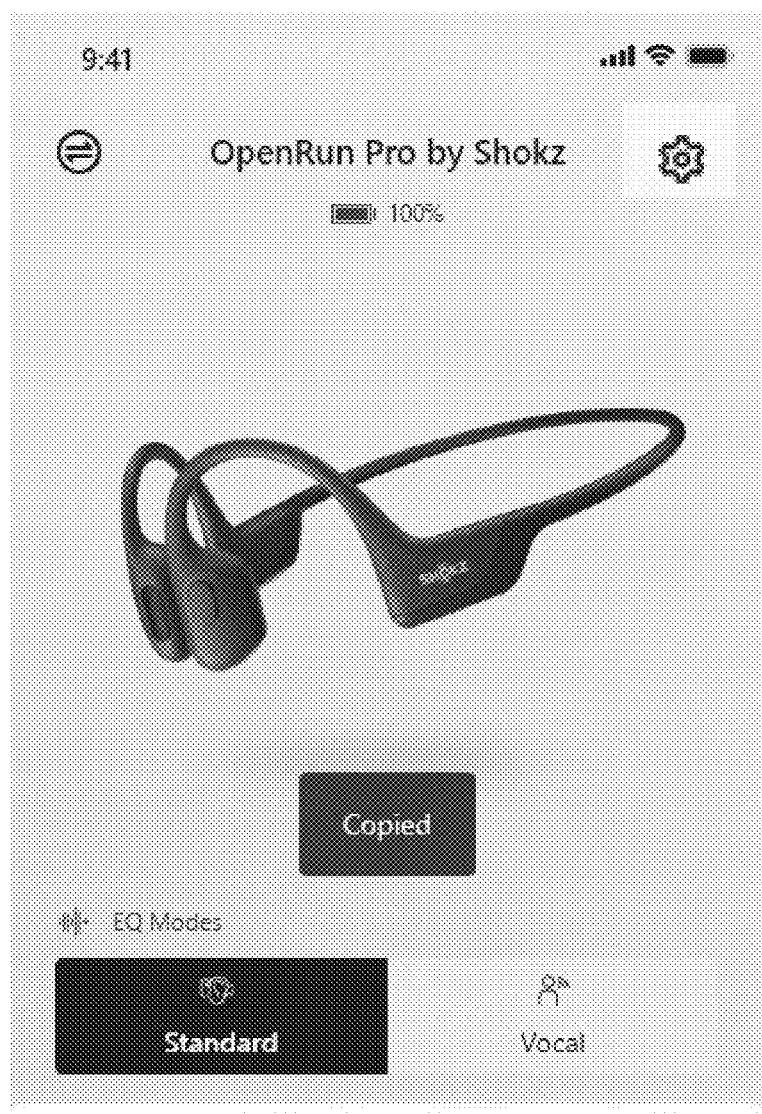
FIG. 9 illustrates a tertiary interface of the first user interface in FIG. 7.
Figure 9:

The main operation interface in FIG. 4 may further include a headphone display region configured to display an overall shape of the headphone. The headphone display region may include a hyperlink. Clicking on a preset position or any position in the headphone region may trigger a secondary interface displaying product information. As shown in FIG. 5, the secondary interface that pops up when clicking the headphone display region may be the same as the main operation interface in FIG. 4. A difference may lie in a lower region of the selection controls for the sound effect modes. The lower region of the selection controls for the sound effect modes of the secondary interface may mainly include a product information description region and a hotkey region. Hotkeys may include a copy key for copying an SN serial number and a close key for closing the secondary interface. After clicking a relevant hotkey, a pop-up window for feedback on a hotkey operation may pop up. For example, after a successful copy, a pop-up window of "copy successfully" may pop up on the secondary interface. Preferably, the pop-up window for feedback on the hotkey operation may disappear after a preset time period.

The disclosure further discloses a method for adjusting a sound effect of a headphone, comprising:

S1, obtaining wearing state information of a human ear and/or type information of an audio file to be played;

S2, selecting, based on the wearing state information of the human ear and/or the type information of the audio file to be played, a corresponding sound effect mode on a terminal device that is in a communication connection with the headphone; and S3, adjusting, based on the corresponding values of the sound parameters of the selected sound effect mode, the sound effect when the headphone plays the audio file.

The present disclosure further discloses a headphone, comprising: a speaker configured to play an audio file; a communication module configured to establish a communication connection with at least one terminal device, wherein the at least one terminal device may include a display screen, the display screen may be configured to display a second user interface, the second user interface may include a multi-device connection function control configured to turn on or off a dual-device connection function, when the multi-device connection function control is turned on, the communication module may be configured to establish a communication connection with at least two terminal devices, and when the multi-device connection control is turned off, the communication module may be configured to establish a communication connection with only one terminal device; and a controller configured to control the communication module to receive the audio file from the terminal device that is in the communication connection with the headphone and control the speaker to play the audio file.

The headphone may be connected to two Bluetooth devices simultaneously. A dual-device connection may include two states: on and off. When the dual-device connection is on, the headphone may pair to two Bluetooth devices simultaneously; and when the dual-device connection is off, the headphone may pair to only one Bluetooth device. Operation rules may include the following operations:

1. The dual-device connection of the headphone may be turned off by default, and the dual-device connection function of the headphone may be turned on through an APP.

2. A connection with the headphone may be established on a second Bluetooth device.

3. At this time, the headphone may be connected to two Bluetooth devices simultaneously, but only an audio of one device may be played at a time.

4. The headphone may play the audio of the device that transmits the audio to the headphone first, and the headphone may not play the audio information of the other device until the device suspends audio transmission.

5. A priority of a mobile phone call may be higher than other audio information. Even if the headphone is playing a song from one of the devices, when the other device has an incoming or outgoing call, the headphone may immediately switch to transmit the information of the device in the call. Audio in other formats may have no priority.

The multi-device connection function control may be a dual-device connection function control configured to turn on the dual-device connection function; the communication module may be configured to establish a Bluetooth connection with at least one terminal device.

The second user interface may further include a terminal connection control configured to establish or disconnect a communication connection between the headphone and the terminal device.

The headphone may further comprise: a speaker configured to play an audio file; a communication module configured to establish a communication connection with at least one terminal device; and a controller configured to control the communication module to receive the audio file from the terminal device and control the speaker to play the audio file. The headphone may have a first connection mode and a second connection mode which are switchable. When the headphone is in the first connection mode, the communication module may be configured to establish the communication connection with at least two terminal devices. When the headphone is in the second connection mode, the communication module may be configured to establish the communication connection with only one terminal device.

Figure 13:
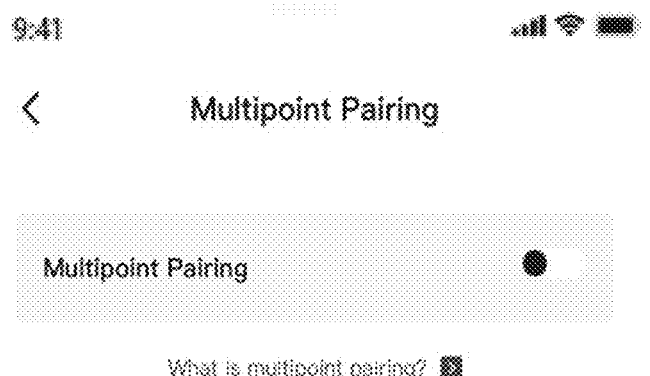
FIG. 13 illustrates an exemplary second user interface displayed on a display screen of the terminal device in FIG. 1.
Figure 14:
FIG. 14 illustrates a secondary interface of the second user interface in FIG. 13.
Figure 14:
Figure 14:
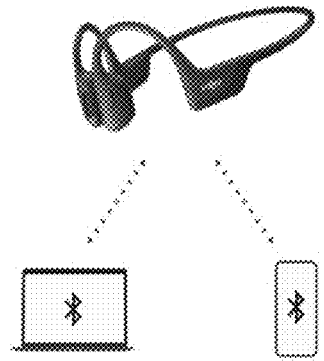

As shown in FIG. 13, as an optional embodiment, the second user interface may include a multi-device connection function control configured to turn on or turn off a dual-device connection function. The multi-device connection function control may be turned off at this time. A hyperlink in FIG. 13, such as "What is multipoint pairing?" may be clicked, and then a secondary interface of the second user interface in FIG. 13 may pop up, as shown in FIG. 14.

Figure 15:
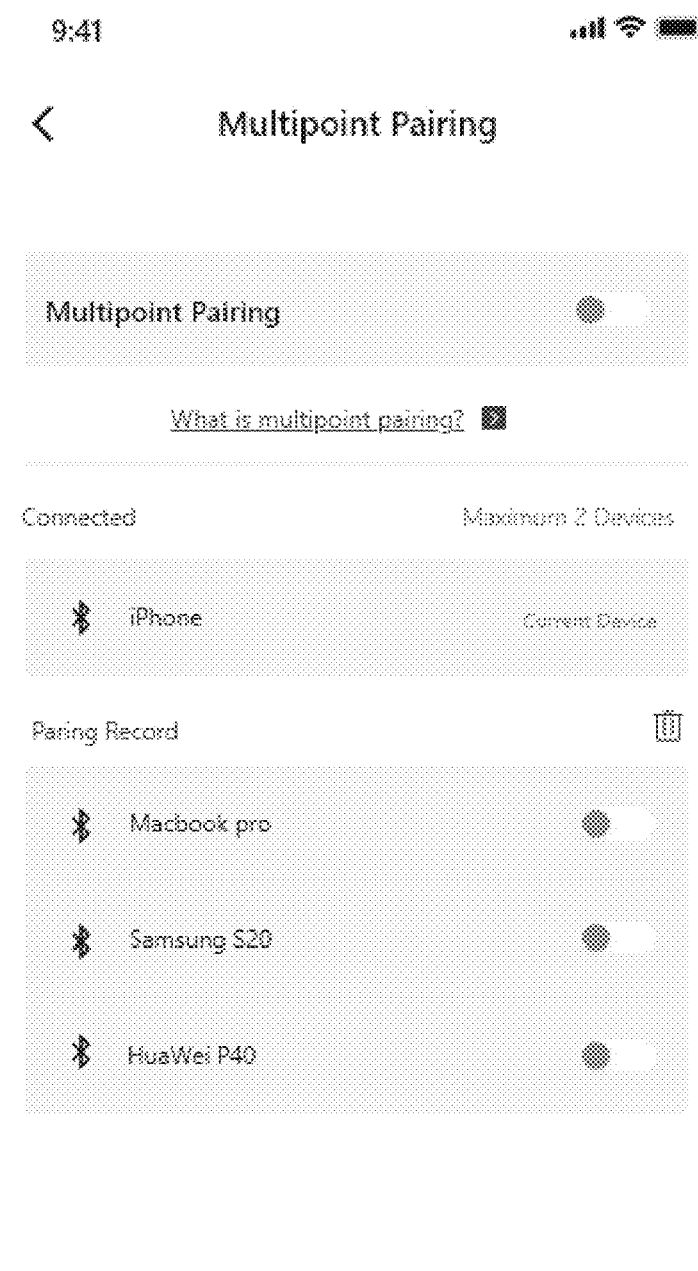
FIG. 15 illustrates an exemplary second user interface displayed on a display screen of the terminal device in FIG. 1.
Figure 16:
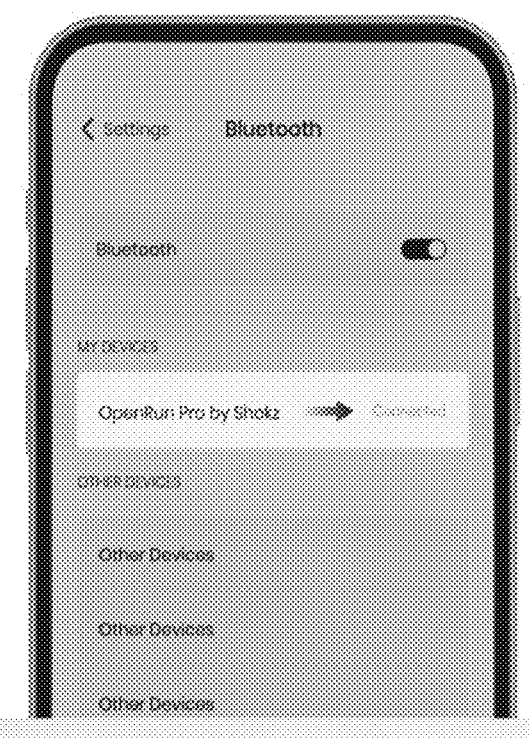
FIG. 16 illustrates a secondary interface of the second user interface in FIG. 15.

As shown in FIG. 15, the second user interface may include a multi-device connection function control configured to turn on or turn off a dual-device connection function. At this time, the multi-device connection function control may be turned on. Then the user may click a hotkey of "Connect To The Second Device" to connect the headphone to the second terminal device, and then the secondary interface of the second user interface in FIG. 15 may pop up, as shown in FIG. 16, to guide the user to pair to the second device.

Figure 17:
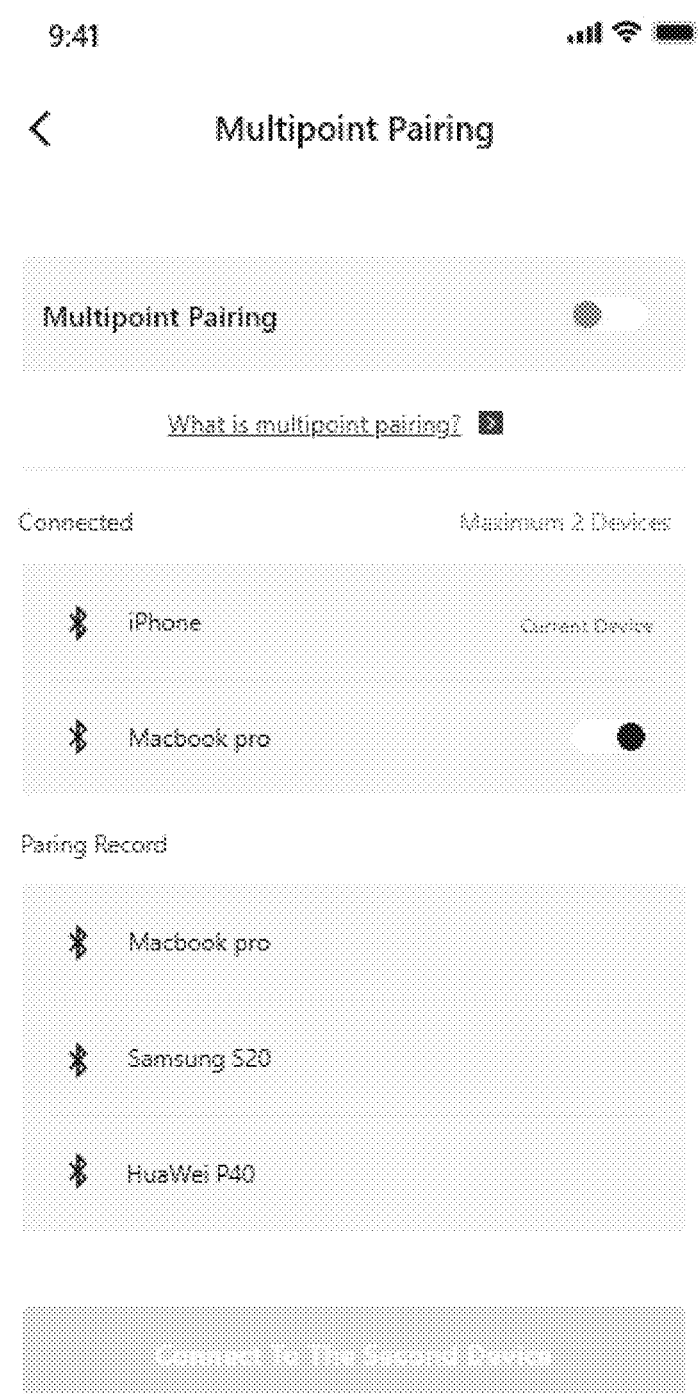
FIG. 17 illustrates a secondary interface of the second user interface in FIG. 15.
Figure 18:
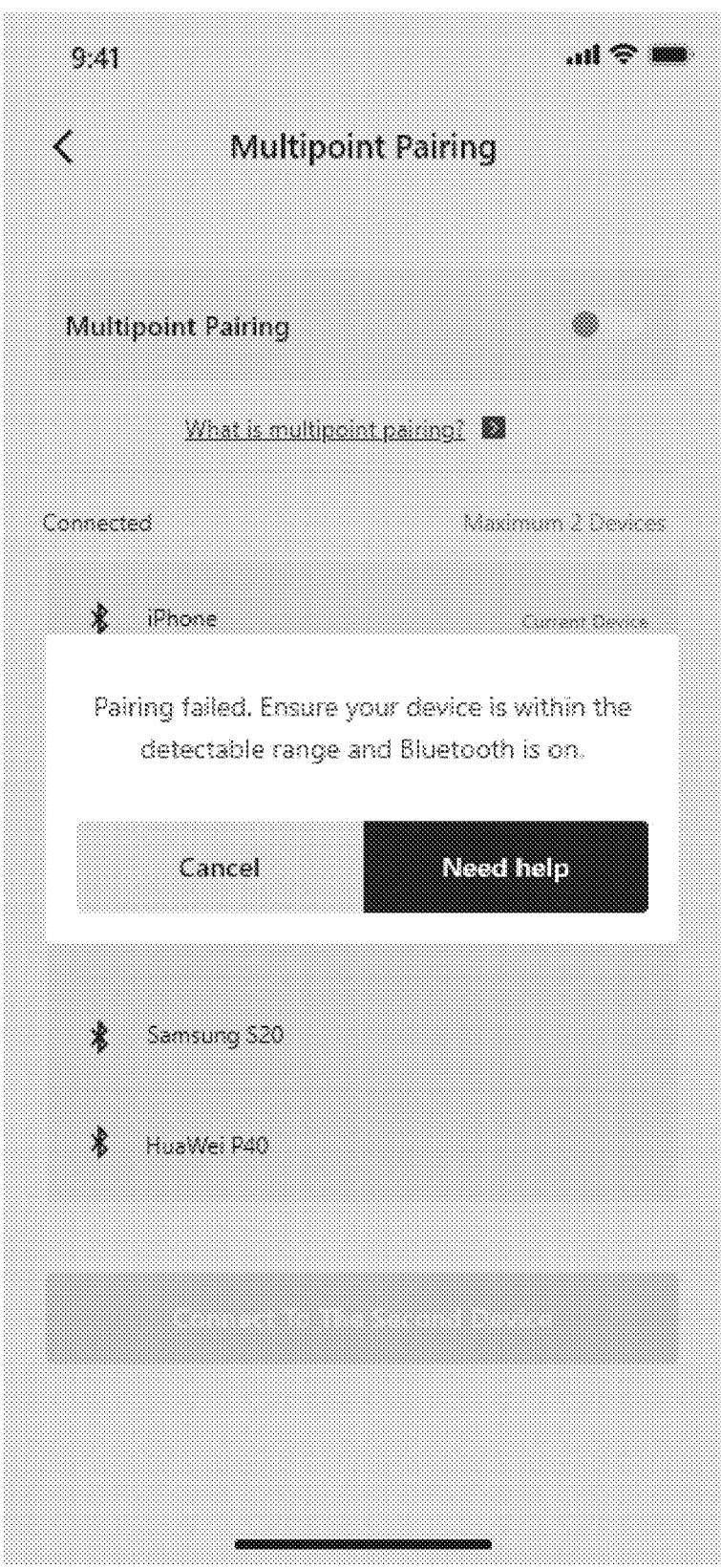
FIG. 18 illustrates a secondary interface of the second user interface in FIG. 15.

FIG. 17 is a secondary interface of the second user interface displayed by an application program when the second device is successfully connected after the user clicks the hotkey of "Connect To The Second Device". FIG. 18 is a secondary interface of the secondary user interface displayed by an application program when the headphone fails to connect to the second device after the user clicks the hotkey of "Connect To The Second Device".

The above are only some embodiments of the disclosure, and are not intended to limit the scope of protection of the disclosure. All equivalent devices or equivalent process transformations made by using the contents of the specification and drawings of the disclosure, or directly or indirectly used in other related technical fields, may fall within the scope of patent protection of the present disclosure in the same way.

What is claimed is:

1. A headphone, comprising:
   a speaker, configured to play an audio file;
   a communication module, configured to establish a communication connection with a terminal device, wherein the terminal device includes a display screen configured to display a first user interface, the first user interface includes one or more selection controls configured to select any sound effect mode from at least two different sound effect modes, and sound parameters of audio streams of the audio file played by the speaker of the headphone in the different sound effect modes have different values;
   an optimization module, configured to adjust, based on a correspondence between a certain sound effect mode and its corresponding values of the sound parameters, values of the sound parameters of an audio stream of the audio file to the corresponding values of the sound parameters of the certain sound effect mode; and
   a sensor, configured to detect a wearing state of a human ear, wherein the wearing state of a human ear includes a state of the human ear without earplugs, and a state of the human ear wearing the earplugs, wherein the state of the human ear wearing the earplugs includes a wearing position and a wearing time of the earplugs; and
   a controller, configured to control the communication module to receive the audio stream of the audio file from the terminal device, control the optimization module to process the audio stream of the audio file and output the audio stream of the audio file to the speaker, and select a specific sound effect mode from the at least two different sound effect modes based on the wearing state of the human ear detected by the sensor, and control the speaker to play the audio file in the specific sound effect mode, wherein the at least two different sound effect modes include a first sound effect mode and a second sound effect mode, wherein the specific sound effect mode is selected from the at least two different sound effect modes based on the wearing state of the human ear detected by the sensor by:
   in response to detecting that the wearing state of the human ear is the state of the human ear without earplugs, automatically selecting the first sound effect mode;
   in response to detecting that the wearing state of the human ear is the state of the human ear wearing the earplugs, automatically selecting the second sound effect mode.

2. The headphone of claim 1, wherein:
   in the first sound effect mode, in a frequency response curve of an electrical signal of the audio file processed by the optimization module, a signal response in a frequency band of 200 Hz-10 KHz has a flat trend, and a signal response in a frequency band below 100 Hz is weaker than the signal response in the frequency band of 200 Hz-10 kHz; and in the second sound effect mode, in a frequency response curve of an electrical signal of the audio file processed by the optimization module, a signal response in a frequency band below 1 kHz is weaker than a signal response in a frequency band above 1 kHz.

3. The headphone of claim 1, wherein:

the at least two different sound effect modes include a third sound effect mode, in the third sound effect mode, in a frequency response curve of an electrical signal of the audio file processed by the optimization module, a signal response in a frequency band of 400 Hz-3 kHz is significantly enhanced relative to signal responses in other frequency bands, and the third sound effect mode suitable for playing an audio file with a proportion of vocal is greater than a first threshold or a proportion of intermediate frequency is greater than a second threshold.

4. The headphone of claim 3, wherein:

the headphone further includes a parsing module configured to parse a type of an audio file to be played; and the controller selects a specific sound effect mode from the at least two different sound effect modes based on the type of the audio file determined by the parsing module, and controls the speaker to play the audio file in the specific sound effect mode.

5. The headphone of claim 3, wherein the at least two different sound effect modes include a fourth sound effect mode, and the fourth sound effect mode is suitable for playing an audio file with the proportion of vocal is less than the first threshold or the proportion of intermediate frequency is less than the second threshold.

6. The headphone of claim 1, wherein:

the headphone further includes a storage and an input module, the input module is configured to input the corresponding values of the sound parameters of each sound effect mode of the at least two different sound effect modes, and the storage is configured to store the corresponding values of the sound parameters of each sound effect mode.

7. The headphone of claim 1, wherein:

the first user interface includes a main operation interface, and the main operation interface includes at least one of: a playback operation control, a Bluetooth connection control, and a tuning control, wherein the playback operation control is configured to control the speaker to play or pause a playback of the audio file, the Bluetooth connection control is configured to connect the headphone to the terminal device, and the tuning control is configured to adjust a volume of the speaker when playing the audio file.

8. The headphone of claim 7, wherein:

the first user interface includes a sound effect setting interface, and the sound effect setting interface pops up when the terminal receives a sound effect setting instruction from the user; and each selection control of the one or more selection controls corresponding to the at least two different sound effect modes includes an operation region for receiving the selection instruction from the user, and a ratio of a total area of the operation regions of the one or more selection controls to a total area of the sound effect setting interface is greater than or equal to 0.2 and less than or equal to 1.

9. The headphone of claim 8, wherein:

the each selection control of the one or more selection controls corresponding to the at least two different sound effect modes further includes an operation description region configured to explain functions of the operation region, wherein when the first user interface is the main operation interface, the operation description region and the operation region at least partially overlap, and when the first user interface is the sound effect setting interface, the operation description region and the operation region are disposed independently.

10. The headphone of claim 9, wherein the operation description region includes an image description area, the image description area contains an image showing a human ear wearing the headphone but not wearing the earplugs, an image showing a human ear wearing the headphone and the earplugs, and an image showing a person speaking.

11. A method for adjusting a sound effect of a headphone, comprising:

obtaining wearing state information of a human ear and type information of an audio file to be played, wherein the wearing state information of a human ear includes a state of the human ear without earplugs, and a state of the human ear wearing the earplugs, wherein the state of the human ear wearing the earplugs includes a wearing position and a wearing time of the earplugs;

selecting, based on the wearing state information of the human ear and the type information of the audio file to be played, a corresponding sound effect mode on a terminal device that is in a communication connection with the headphone, wherein the selecting the corresponding sound effect mode based on the wearing state of the human ear and the type information of the audio file to be played includes:

in response to detecting that the wearing state of the human ear is the state of the human ear without earplugs, automatically selecting the first sound effect mode;

in response to detecting that the wearing state of the human ear is the state of the human ear wearing the earplugs, automatically selecting the second sound effect mode; and adjusting, based on corresponding values of sound parameters of the selected sound effect mode, the sound effect when the headphone plays the audio file.

12. A headphone, comprising: a speaker, configured to play an audio file;

a communication module, configured to establish a communication connection with at least one terminal device, wherein the at least one terminal device includes a display screen configured to display a second user interface, the second user interface includes a multi-device connection function control configured to turn on or off a dual-device connection function, when the multi-device connection function control is turned on, the communication module is configured to establish the communication connection with at least two terminal devices, and when the multi-device connection control is turned off, the communication module is configured to establish a communication connection with only one terminal device;

a sensor, configured to detect a wearing state of a human ear, wherein the wearing state of a human ear includes a state of the human ear without earplugs, and a state of the human ear wearing the earplugs, wherein the state of the human ear wearing the earplugs includes a wearing position and a wearing time of the earplugs; and a controller, configured to control the communication module to receive the audio file from the terminal device that is in the communication connection with the headphone, control the speaker to play the audio file, and select a specific sound effect mode from at least two different sound effect modes based on the wearing state of the human ear detected by the sensor, wherein the at least two different sound effect modes include a first sound effect mode and a second sound effect mode, wherein the specific sound effect mode is selected from the at least two different sound effect modes based on the wearing state of the human ear detected by the sensor by:

in response to detecting that the wearing state of the human ear is the state of the human ear without earplugs, automatically selecting the first sound effect mode;

in response to detecting that the wearing state of the human ear is the state of the human ear wearing the earplugs, automatically selecting the second sound effect mode.

13. The headphone of claim 12, wherein:

the multi-device connection function control is a dual-device connection function control configured to turn on a dual-device connection function; and the communication module is configured to establish a Bluetooth connection with at least one terminal device.

14. The headphone of claim 12, wherein:

the second user interface further includes a terminal connection control configured to establish or disconnect a communication connection between the headphone and the terminal device.

15. The headphone of claim 12, wherein the display screen is further configured to display a third user interface, the third user interface includes one or more selection controls configured to select any sound effect mode from the at least two different sound effect modes, and sound parameters of audio streams of the audio file played by the speaker of the headphone in the different sound effect modes have different values.

16. The headphone of claim 15, further comprising:

an optimization module, configured to adjust, based on a correspondence between a certain sound effect mode and its corresponding values of the sound parameters, values of the sound parameters of an audio stream of the audio file to the corresponding values of the sound parameters of the certain sound effect mode.

17. The headphone of claim 16, wherein:

in the first sound effect mode, in a frequency response curve of an electrical signal of the audio file processed by the optimization module, a signal response in a frequency band of 200 Hz-10 kHz has a flat trend, and a signal response in a frequency band below 100 Hz is weaker than the signal response in the frequency band of 200 Hz-10 kHz; and in the second sound effect mode, in a frequency response curve of an electrical signal of the audio file processed by the optimization module, a signal response in a frequency band below 1 kHz is weaker than a signal response in a frequency band above 1 kHz.

18. The headphone of claim 16, wherein:

the at least two different sound effect modes include a third sound effect mode, in the third sound effect mode, in a frequency response curve of an electrical signal of the audio file processed by the optimization module, a signal response in a frequency band of 400 Hz-3 kHz is significantly enhanced relative to signal responses in other frequency bands.

19. The headphone of claim 15, wherein:

the headphone further includes a parsing module configured to parse a type of an audio file to be played; and the controller selects a specific sound effect mode from the at least two different sound effect modes based on the type of the audio file determined by the parsing module, and controls the speaker to play the audio file in the specific sound effect mode.

* * * * *